US010017117B2

United States Patent
Lewis et al.

(10) Patent No.: US 10,017,117 B2
(45) Date of Patent: Jul. 10, 2018

(54) VEHICLE OCCUPANT VIEWING SYSTEMS AND METHODS

(71) Applicant: GM GLOBAL TECHNOLOGY OPERATIONS LLC, Detroit, MI (US)

(72) Inventors: Allan K. Lewis, Windsor (CA); Michael T. Chaney, Jr., Royal Oak, MI (US); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 15/158,186

(22) Filed: May 18, 2016

(65) Prior Publication Data

US 2017/0334357 A1 Nov. 23, 2017

(51) Int. Cl.
*H04N 5/225* (2006.01)
*B60R 1/00* (2006.01)
*H04N 7/18* (2006.01)
*G06K 9/32* (2006.01)
(Continued)

(52) U.S. Cl.
CPC ............ *B60R 1/008* (2013.01); *G06K 9/3233* (2013.01); *G06T 7/0081* (2013.01); *G06T 11/60* (2013.01); *H04N 5/2257* (2013.01); *H04N 7/181* (2013.01); *B60R 2300/105* (2013.01); *B60R 2300/303* (2013.01); *B60R 2300/8006* (2013.01); *B60R 2300/8046* (2013.01); *G06T 2207/10016* (2013.01); *G06T 2207/30196* (2013.01); *G06T 2207/30268* (2013.01)

(58) Field of Classification Search
CPC ............ G06K 9/00838; G06K 9/00369; G06T 2207/10004; G06T 2207/30196; G06T 2207/30232; G06T 2207/30268
See application file for complete search history.

(56) References Cited

U.S. PATENT DOCUMENTS

| | | | | |
|---|---|---|---|---|
| 2008/0270569 A1* | 10/2008 | McBride | ........... | G06F 17/30017 709/217 |
| 2012/0105642 A1* | 5/2012 | Nojiri | ...................... | B60R 1/00 348/148 |

(Continued)

OTHER PUBLICATIONS

Levi and Silberstein, Tracking and motion cues for rear-view pedestrian detection, IEEE 18th International Conference on Intelligent Transportation Systems, 2015, 8 pages.

*Primary Examiner* — Huy Thanh Nguyen
(74) *Attorney, Agent, or Firm* — Reising Ethington, P.C.

(57) ABSTRACT

A vehicle occupant viewing system and a corresponding method for displaying a vehicle occupant on an image display unit. The system may comprise one or more vehicle interior cameras for obtaining occupant images of one or more occupants in rear seats of the vehicle. The system may include two vehicle interior cameras, one in a forward facing orientation and another in a rear facing orientation, which can capture occupant images of occupants in forward facing positions and occupants in rear facing positions such as infants in car seats. The system may also include one or more modular vehicle interior cameras that are moveable between various orientations in order to capture occupant images of either forward or rear facing passengers. Adjustments can be made to display the occupant images to the driver in a more intuitive arrangement.

23 Claims, 3 Drawing Sheets

(51) Int. Cl.
*G06T 7/00* (2017.01)
*G06T 11/60* (2006.01)

(56) References Cited

U.S. PATENT DOCUMENTS

| | | | | |
|---|---|---|---|---|
| 2015/0015706 A1* | 1/2015 | Hatori | ................ | G06K 9/00832 348/148 |
| 2015/0199647 A1* | 7/2015 | Shin | ................... | G06Q 10/1053 705/321 |
| 2016/0082888 A1* | 3/2016 | Kothari | .................... | B60R 1/00 348/148 |

* cited by examiner

VEHICLE OCCUPANT VIEWING SYSTEMS AND METHODS

FIELD

The present invention relates generally to occupant viewing systems for a vehicle, and, more particularly, to systems and methods for displaying occupant images to a driver based on occupant positions and camera orientations. In one embodiment, the occupant viewing system uses an electronic display mirror to display the occupant images.

BACKGROUND

Image display units in vehicles may provide additional information to a driver besides simply a view of outside of the vehicle or information regarding general vehicle operations. For example, additional information may be added to an image display unit, such as an electronic display mirror, to supplement the driver's view of an area outside of the vehicle. One potential drawback of image display units, with respect to electronic display mirrors in particular, involves showing additional information to the driver in an intuitive fashion without obstructing the other functionalities involved with the image display units. The system and method described herein address this presentation of additional information to the driver.

SUMMARY

According to one embodiment, there is provided a vehicle occupant viewing system comprising an image display unit, a vehicle interior camera having a field of view at least partially covering an interior cabin of the vehicle, and a video processing unit coupled to the image display unit and the vehicle interior camera. The video processing unit is configured to receive input from the vehicle interior camera, determine whether an occupant is present in the field of view of the vehicle interior camera, and when an occupant is present in the field of view, overlay an occupant image of the occupant onto another image or video being shown in the image display unit in accordance with the vehicle interior camera's orientation and the occupant's position in the vehicle.

According to another embodiment, there is provided a vehicle occupant viewing system comprising an image display unit, a first vehicle interior camera having a first field of view, and a second vehicle interior camera having a second field of view. The first field of view of the first vehicle interior camera and the second field of view of the second vehicle interior camera at least partially overlap. The system also comprises a video processing unit coupled to the image display unit and the first and second vehicle interior cameras. The video processing unit is configured to receive input from the first and second vehicle interior cameras, determine whether an occupant is present in the first field of view of the first vehicle interior camera, the second field of view of the second vehicle interior camera, or both the first field of view of the first vehicle interior camera and the second field of view of the second vehicle interior camera, and display an occupant image on the image display unit in accordance with the occupant's position in the vehicle.

According to another embodiment, there is provided a vehicle occupant viewing system comprising an image display unit, a plurality of vehicle interior camera docking stations located in an interior cabin of the vehicle, a modular vehicle interior camera configured to mount in one of the vehicle interior camera docking stations and configured to be movable between the plurality of vehicle interior docking stations, and a video processing unit coupled to the image display unit and the plurality of vehicle interior camera docking stations. The video processing unit is configured to receive input from the modular vehicle interior camera, determine whether an occupant is present in the field of view of the vehicle interior camera, and when an occupant is present in the field of view, display an occupant image on the image display unit in accordance with the occupant's position in the vehicle or the modular vehicle interior camera's mounting orientation.

According to another embodiment, there is provided a method of displaying a vehicle occupant on an image display unit. The method comprises the steps of receiving input from a vehicle interior camera, the vehicle interior camera having a field of view at least partially covering an interior cabin of the vehicle; determining whether an occupant is present in the vehicle interior camera field of view; and when an occupant is present in the vehicle interior camera field of view, displaying an occupant image on the image display unit in accordance with the vehicle interior camera's orientation and the occupant's position in the vehicle.

DRAWINGS

Preferred exemplary embodiments will hereinafter be described in conjunction with the appended drawings, wherein like designations denote like elements, and wherein.

DESCRIPTION

The system and method described herein can provide enhanced views of vehicle occupants that are easily accessible by, and more intuitive to, the driver. One or more vehicle interior cameras may be used to provide real time video of occupants in the form of occupant images on an image display unit. In one embodiment, the image display unit of the occupant viewing system is an electronic display mirror which is designed to replace a traditional rear view mirror and provide a video feed of the road behind the vehicle. The occupant images may be overlaid or otherwise integrated with a rear view video feed so that the driver does not have to look back to see the occupants in one or more rear rows of the vehicle. In order to provide the occupant images to the driver in a more intuitive arrangement, certain compensations may need to be made depending on the occupant's position and/or the camera's orientation. For example, the system and method described herein may be able to display video of a rear facing infant in a car seat obtained from a forward facing camera. Automatic adjustments can be made if video feed is to be provided showing one or more forward facing occupants obtained from a camera in a rear facing orientation.

Figure 1:
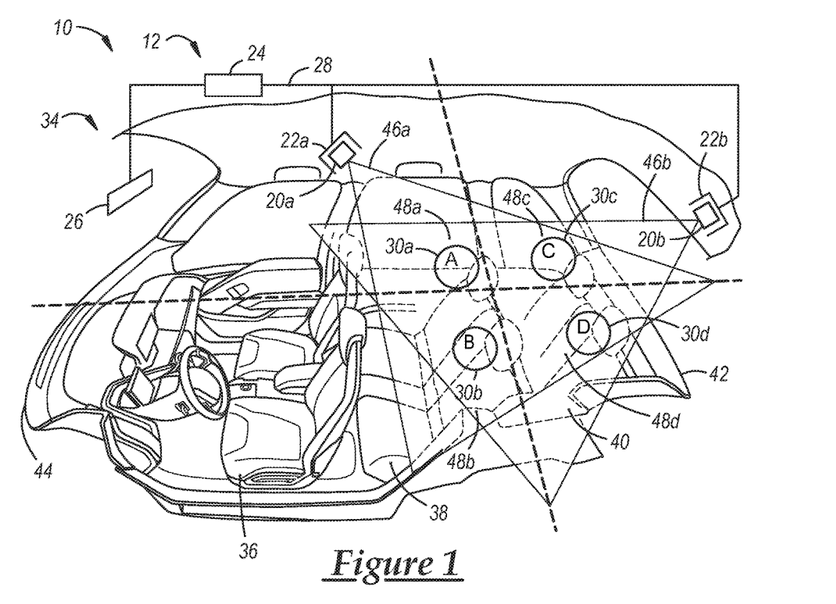
FIG. 1 is a partially schematic illustration of a vehicle interior cabin with views of two vehicle interior cameras and their respective fields of view which may be part of a vehicle occupant viewing system.

Turning now to FIG. 1, there is shown a general and schematic view of an exemplary vehicle occupant viewing system 10 installed on a host vehicle 12. It should be appreciated that the present system and method may be used with any type of vehicle, including traditional vehicles, hybrid electric vehicles (HEVs), extended-range electric vehicles (EREVs), battery electrical vehicles (BEVs), motorcycles, passenger vehicles, sports utility vehicles (SUVs), cross-over vehicles, trucks, vans, buses, recreational vehicles (RVs), etc. These are merely some of the possible applications, as the vehicle occupant viewing system and method described herein are not limited to the exemplary embodiments shown in the drawings, and could be implemented in any number of different ways.

According to one example, the vehicle occupant viewing system 10 is mounted or installed on a vehicle 12 and includes vehicle interior cameras 20a, 20b, vehicle interior camera docking stations 22a, 22b, a video processing unit 24, and an image display unit 26, all of which or portions of which may be connected via a vehicle communication network or bus 28. The present system and method are not limited to any particular vehicle communication network, as any suitable network or bus may be used (e.g., a Controller Area Network (CAN), a Local Interconnect Network (LIN), Byteflight, a Domestic Digital Bus (D2B), FlexRay, Media Oriented Systems Transport (MOST), a wireless bus, or some other type of network or combination of networks known in the art). Furthermore, it is possible for the vehicle occupant viewing system 10 or its various components to be part of, or to at least be utilized by, other vehicle systems such as external object recognition systems, parking assist systems, infotainment systems, etc.

Figure 2:
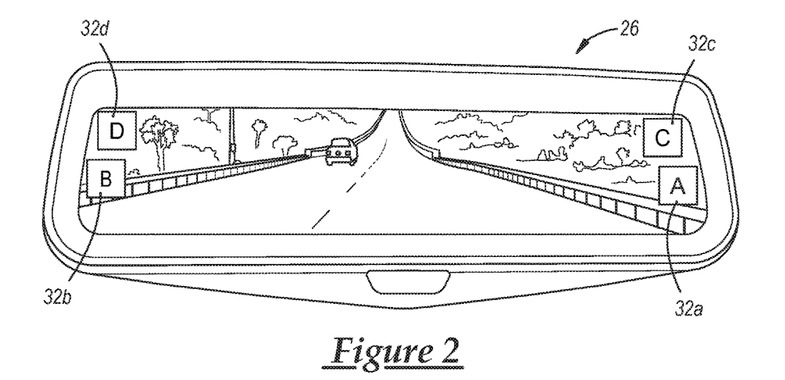
FIG. 2 is an illustration of an image display unit with schematic representations of occupant images corresponding to the scenario and vehicle occupant viewing system illustrated in FIG. 1.

With reference to FIGS. 1 and 2, vehicle interior cameras 20a, 20b provide the vehicle occupant viewing system 10 with video and/or still image output of one or more vehicle occupants 30a-d in the form of occupant images 32a-d in an interior cabin 34 of the vehicle 12. More particularly, the interior cabin 34 can have a first seating row 36, a second seating row 38, and, optionally, a third seating row 40, with the vehicle interior cameras 20a, 20b providing various views of occupants 30a-b in the second seating row 38 and/or occupants 30c-d the third seating row 40. It is possible to have only one vehicle interior camera 20, two vehicle interior cameras 20a, 20b, as illustrated, or more vehicle interior cameras, depending on the desired implementation. The vehicle interior camera 20 may be mounted to or a part of any operable assembly, such as part of the image display unit 26, which in this embodiment, is a rear view electronic display unit.

In the embodiment illustrated in FIG. 1, the vehicle occupant viewing system 10 includes a vehicle interior camera 20a mounted in or otherwise coupled with a vehicle interior camera docking station 22a. The vehicle interior camera 20a is in a rearward facing orientation that is oriented toward a rear end 42 of the vehicle 12. Preferably, although not necessarily, the vehicle interior camera 20a is mounted in the vehicle interior camera docking station 22a which is located in a side headliner of the vehicle 12. The vehicle occupant viewing system 10 also includes a vehicle interior camera 20b mounted in or otherwise coupled with the vehicle interior camera docking station 22b. The vehicle interior camera 20b is in a forward facing orientation that is oriented toward a front end 44 of the vehicle 12. Like the vehicle interior camera 20a, the vehicle interior camera 20b may be mounted in a vehicle interior camera docking station 22b which is located in a headliner near the rear view window of the vehicle 12. The rearward facing orientation of vehicle interior camera 20a is generally used to obtain occupant images of forward facing occupants, while the forward facing orientation of vehicle interior camera 20b is generally used to obtain occupant images of rearward facing occupants.

In one embodiment, the vehicle interior camera 20 is a modular vehicle interior camera that is movable between a plurality of vehicle interior camera docking stations 22. Accordingly, if a vehicle interior camera is mounted in a rearward facing orientation to view one or more forward facing occupants and the driver would like to instead view a rearward facing occupant, such as an infant in a car seat, the modular vehicle interior camera can be removed from its current vehicle interior camera docking station and moved to another vehicle interior camera docking station such that it is in a forward facing orientation. Alternatively, the modular vehicle interior camera may be movable around the interior cabin 34 via some other mechanism, such as via an articulating arm or in any other operable fashion. Furthermore, the vehicle interior cameras may not have a vehicle interior camera docking station at all, and may be flush mounted and/or integrated with another vehicle component such as a vehicle seat or headrest, headliner, full display mirror, etc.

Some non-limiting examples of vehicle interior cameras 20 include those based on charge coupled device (CCD) or complementary metal oxide semiconductor (CMOS) technology, providing standard, wide-angle, or ultra-wide-angle video output of the vehicle interior cabin 34. It should be appreciated that the video interior cameras 20 are not limited to any particular type, brand or model. Some potential embodiments or features that may be used with cameras 20 include: surface mount, flush mount, or rear view mirror mount cameras; wired or wireless cameras; infrared LEDs for night vision; and wide angle or fish eye lenses, to cite a few possibilities. While driving vehicle 12, it is expected that a driver can view one or more vehicle occupants 30a-d in the second seating row 38 and/or the third seating row 40 with captured video output, the present system and method presenting modified video output to the driver, as will be explained in more detail. The vehicle interior camera 20 can be directly or indirectly connected to the video processing unit 24, as illustrated in FIG. 1 which shows the cameras connected to the video processing unit via the vehicle bus 28.

With reference to FIG. 1, the first vehicle interior camera 20a has a first field of view 46a, and the second vehicle interior camera 20b has a second field of view 46b. In this particular embodiment, although not necessary, the first field of view 46a and the second field of view 46b at least partially overlap to provide views from various orientations of the interior cabin 34 of the vehicle 12. Within each field of view 46, there may be a number of occupant viewing subsections 48a-d, which, given the overlapping field of views 46a, 46b, at least partially overlap in this embodiment, so only one reference numeral is provided for clarity purposes. However, it is possible that there will be no overlap between one or more of the vehicle occupant viewing subsections. The occupant viewing subsections 48 are generally delimited in this embodiment by the dotted lines shown in FIG. 1.

In the illustrated embodiment, the field of view 46a includes a left side perspective which generally encompasses occupant viewing subsections 48a, 48c, and a right side perspective which generally encompasses occupant viewing subsections 48b, 48d. Given the forward facing orientation of the vehicle interior camera 20b, the field of view 46b is opposite—including a left side perspective which generally encompasses occupant viewing subsections 48a, 48c, and a right side perspective which generally encompasses occupant viewing subsections 48b, 48d. Moreover, as previously described, there may only be two seating rows such that the occupant viewing subsections are fully defined by the left side perspective and the right side perspective. Additionally, other occupant viewing subsection partition schemes may be implemented, such as if three or more occupants are present in a single row. The occupant viewing subsections such as the left side perspective and the right side perspective may be a function of or defined by the camera field of view itself, or, as another example, object recognition detection algorithms may be used to partition the field of view into various occupant viewing subsections, such as by using various structures in the interior cabin such as the seats, as is shown. The occupant viewing subsections are generally used by the video processing unit 24 to create the occupant images 32a-d that are displayed on the image display unit 26 to the driver or another occupant in the first seating row 36. As will be detailed further below, an occupant's position and/or a vehicle interior camera's orientation may be used to display the occupant images to the driver in a more intuitive fashion.

Video processing unit 24 acts as the main controller or control module of the vehicle occupant viewing system 10 and is at least partially responsible for performing or carrying out the method described below. According to an exemplary embodiment, the video processing unit 24 is coupled to the vehicle interior cameras 20 to receive video output. The video processing unit 24 is also coupled to image display unit 26 to provide modified video output, although other combinations of devices may be coupled to the video processing unit instead. It should be understood that "coupled" may mean a wired connection, such as via vehicle bus 28, a wireless connection, or some combination of wired and wireless connections. Video processing unit 24 may include any variety of electronic processing devices, memory devices, input/output (I/O) devices, and/or other known components, and may perform various control and/or communication related functions.

In an exemplary embodiment, the video processing unit 24 includes an electronic memory device that may receive and store any combination of the following items: video content from vehicle interior cameras 20, look up tables or other data structures, algorithms (e.g., algorithms embodied in the exemplary method described below, such as object detection algorithms), etc. Video processing unit 24 may also include an electronic processing device (e.g., a microprocessor, a microcontroller, an application specific integrated circuit (ASIC), etc.) that executes instructions for software, firmware, programs, algorithms, scripts, applications, etc. that are stored in the memory device and may govern the methods described herein. Video processing unit 24 may be electronically connected to other vehicle devices, modules, and systems via bus 28 or some other suitable communication means and can interact with them when required. In a preferred embodiment, video processing unit 24 is a general control unit or processing unit used by other vehicle systems, such as parking assist systems or active safety systems that require processing of video feed from one or more cameras that have fields of view of areas outside of the vehicle. A video processing unit associated with a backup camera is one example of such a general control unit. These are, of course, only some of the possible arrangements, functions and capabilities of video processing unit 24, as other embodiments could also be used.

With reference to FIGS. 1 and 2, image display unit 26 displays video or still image output of one or more occupants 30a-d of the vehicle 12. According to the exemplary embodiment of FIG. 1, the image display unit 26 is coupled to video processing unit 24 or some other device within the vehicle occupant viewing system 10 via the vehicle bus 28 and in one example, displays modified video output in the form of occupant images 32a-d to the driver in real time. In a preferred embodiment shown in FIG. 2, the image display unit 26 is an electronic display mirror or full display mirror that provides, among other things, the driver with a view of the area behind the vehicle 12. The image display unit 26 may utilize any number of different display technologies, such as a liquid crystal display (LCD) or a light emitting diode (LED) display. It should be appreciated that the system and method described herein may use any suitable type of image display unit 26 and are not limited to any particular one. For instance, the image display unit may be the type where the entire viewable surface of the display shows video from one or more cameras; it may be the type where only a portion of the display surface shows video from one or more cameras, whereas other portions of the display surface show other information (e.g., mirrored reflections, other camera angles, etc.); it could have daytime and nighttime modes that adjust the brightness accordingly; or it could have a touch screen so that users can make selections or otherwise input data, to cite a few of the possibilities. For example, a front row occupant may be able to x-out one or more of the occupant images 32a-d if he or she does not wish to have a particular image on the image display unit 26.

The image display unit 26 as shown in FIG. 2, can be used in lieu of a traditional rear view mirror, and is also shown with a picture-in-picture type of presentation where an area behind the vehicle 12 is shown on the majority of the display, and occupant images 32a-d are shown on each side of the display. Overlaying the occupant images on an image or video being shown in the image display unit 26 may include a picture-in-picture arrangement, a split-screen arrangement, or any operable arrangement for blending, scaling, multiplexing, etc., the two images and/or video feeds. While it is not necessary for the display 26 to be arranged according to picture-in-picture or split-screen arrangements, such an arrangement can provide a view of one or more occupants 30a-d in a manner that is more intuitive. For example occupants 30a, 30b are displayed in occupant images 32a, 32b toward the bottom of the image display unit 26. Since occupants 30a, 30b are seated in the second row 38 which is closer to the driver, their corresponding occupant images 32a, 32b may be shown in a location on the image display unit that is typically closer to the driver. Further, occupants 30b, 30d are seated on the left side of the vehicle 12, and accordingly, their occupant images 32b, 32d can be displayed on the left side of the image display unit 26. Similarly, occupants 30a, 30c are on the right side of the vehicle 12, and accordingly, their occupant images 32a, 32c can be displayed on the right side of the image display unit 26.

The image display unit 26 may be any operable display device, not merely an electronic display mirror. Accordingly, the image display unit 26 may be mounted at any number of locations around the vehicle 12. For example, the image display unit 26 could be part of a center stack or center console assembly that is typically located beneath the dashboard in between the front driver and passenger seats. Any operable configuration for the image display unit 26 or display type and/or method may be employed.

Any of the devices 20-26 may be stand-alone devices, as illustrated in FIG. 1, or they may be incorporated or included within some other device, unit or module in the vehicle 12 (e.g., the video processing unit 24 could be integrated within the image display unit 26, an instrument cluster control module, or any other control module, etc.). Furthermore, any of the devices 20-26 may be dedicated devices, as depicted in FIG. 1, or they may be part of or shared by other systems or sub-systems in the vehicle (e.g., cameras 20 could be part of an active safety system, the video processing unit 24 could be part of a parking assist system with a backup camera, the display unit 26 could be part of a vehicle infotainment system, etc.). The video output from the cameras 20 may be directly provided to video processing unit 24 or indirectly provided through some other device, module and/or system, as is commonly known in the art. Similarly, the modified video output from video processing unit 24 may be directly or indirectly provided to the image display unit 26. Accordingly, the devices 20-26 are not limited to the schematic representation in FIG. 1 or the exemplary descriptions above, nor are they limited to any particular embodiment or arrangement so long as they can be used with the method described herein.

Figure 3:
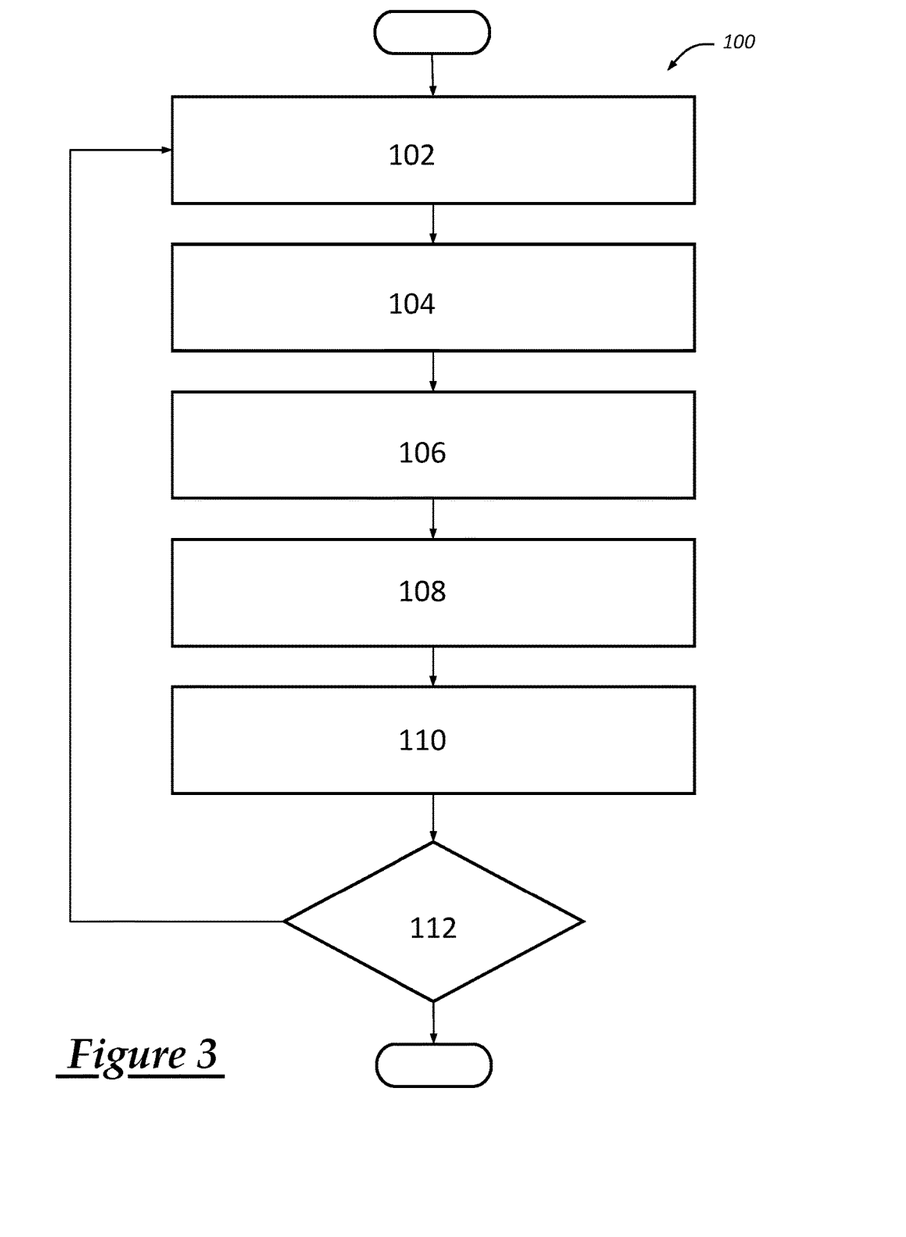
FIG. 3 is a flowchart of an exemplary embodiment of a method of displaying a vehicle occupant on an image display unit that may be used with the vehicle occupant viewing system of FIG. 1.

Turning now to FIG. 3, there is shown a flowchart of an exemplary method of displaying a vehicle occupant 100 that may be used in conjunction the vehicle occupant viewing system 10. Skilled artisans will appreciate that the method and its various steps and substeps may be adjusted and/or adapted depending on the particular implementation of the vehicle occupant viewing system 10. As will be described in further detail below, the method may depend at least partially on the number and orientation of vehicle occupants, as well as the arrangement and orientation of one or more vehicle interior cameras. Furthermore, as will be apparent, certain steps or substeps may be optional or not necessary depending on the number and orientation of vehicle occupants, as well as the arrangement and orientation of one or more vehicle interior cameras. Accordingly, while the method below is described primarily with reference to the vehicle occupant viewing system 10 depicted in FIG. 1, other system adaptations and corresponding method adaptations are certainly possible.

Step 102 of the method 100 involves receiving input from one or more vehicle interior cameras 20. The input may include any operable camera output/video feed, including but not limited to, real-time streaming video or a series of images. According to one embodiment, the video processing unit 24 receives the input from one or more vehicle interior cameras 20. In addition to the video feed, the input may include a unique identifier for each camera, such as a camera IP address, a media access control (MAC) address, or another address, protocol, or identifier. The unique identifier may be used to provide camera modularity so that the vehicle interior cameras can be interchangeably moved around the vehicle interior, as will be described. Additionally, the input may or may not include information such as time stamps or other camera-related metadata.

Step 104 involves processing the input received in step 102. This step may or may not be necessary depending on the vehicle interior camera type and input. Typically, the processing is performed by the video processing unit 24, although any operable combination of modules or processing devices may be used. To accomplish the processing, any suitable image processing techniques may be used including, but not limited to, thresholding, edge detecting, transforming, matching, filtering, segmentation, classification techniques, object and feature detection, surface friction prediction, frequency waveform analysis, tracking, as well as any others known in the art. Image dewarping processes may be employed, and may be particularly advantageous to correct lens distortion as needed if the vehicle interior camera 20 has a wide field of view 46. Preferably, step 104 results in a modified video output that includes an occupant appearance which is invariant or mostly invariant to the camera lens distortion, the camera tilt, and the image position of the occupant. The processing involved in step 104 may extract still images from the input received in step 102, or it may involve direct processing of streaming video itself.

Step 106 of the method 100 involves determining if an occupant is present in the field of view 46 of at least one of the vehicle interior cameras 20. In a more particular embodiment, step 106 may involve determining whether an occupant is present in one or more occupant viewing subsections 48. This step may involve the use of an object detection processing algorithm, executed in one embodiment by the video processing unit 24. Accordingly, in some implementations, there may be some overlap between the processing steps executed in steps 104 and 106. In a preferred embodiment, a two stage object recognition algorithm may be used in step 106 to identify occupants, and as will be described in further detail below, the occupant(s) position. An example object recognition algorithm that may be used is an Accelerated Feature Syntheses (AFS) algorithm, as described in Dan Levi & Shai Silberstein, "Tracking and Motion Cues for Rear-View Pedestrian Detection," 2015 IEEE 18th International Conference on Intelligent Transportation Systems, which is hereby incorporated by reference in its entirety. However, it is possible to use any operable object detection method, such as part-based methods or template-based methods, to cite a few examples.

With reference to FIG. 1, the occupants 30 detected in step 106 are typically in one or more rear seating rows of the interior cabin 34 of the vehicle 12, such as the second row 38 and/or the third row 40. In this embodiment, there are four occupants 30*a-d*. In one example, occupant 30*a* may be an infant in a rear facing car seat, occupant 30*b* may be a forward facing young adult, occupant 30*c* may be a forward facing older passenger, and occupant 30*d* may be a forward facing pet such as a dog. Given the overlapping fields of view 46*a*, 46*b* of the respective vehicle interior cameras 20*a*, 20*b*, various perspectives of each occupant 30*a-d* may be detected in step 106. It should further be understood that the occupants may be detected based upon likely associated features instead of the occupant itself. For example, step 106 may be able to determine that occupant 30*a* is a rearward facing infant in a car seat based on the input from camera 20*a*, which could recognize the car seat without a direct view of the rearward facing infant.

When it is determined in step 106 that an occupant is present, step 108 involves extracting video data from an occupant region of interest to form an occupant image 32. The occupant image is preferably real-time, or almost real-time streaming video feed of an occupant 30, which is typically cropped to eliminate extraneous information that would not be of use to a viewer or may help to frame the occupant image 32 more precisely within the image display unit 26. Other image formats are certainly possible, such as a series of still images or other modified image outputs. This step may be accomplished with the assistance of one or more earlier processing steps, such as object recognition. Furthermore, the amount of extracted video data may vary depending on the occupant 30. For example, with an infant occupant 30a, the whole body of the infant may be provided in the occupant image 32a, while for older occupants 30b, 30c, only the face may be provided in the occupant image 32b, 32c. For an occupant 30d which may be a pet, step 106 may be continuously or periodically readjusted depending on the movement of the occupant. This continuous or periodic adjustment of the occupant region of interest may be performed for any type of occupant, not merely pets, but is more advantageous for animated or quick moving occupants. Any adjustment regime and occupant image cropping scheme may be employed, and as described above, may vary depending upon the type and/or movement of the occupant.

Step 110 involves displaying the occupant image 32 on the image display unit 26 in accordance with the occupant's position in the vehicle 12 and/or orientation of the vehicle interior camera 20. Advantageously, the occupant images 32 are displayed on the image display unit 26 in a manner that is more intuitive to the driver or another occupant in the first row 36. For example, as shown in FIG. 2, occupants 30a, 30b are displayed in occupant images 32a, 32b toward the bottom of the image display unit 26. Since occupants 30a, 30b are in the second row 38 which is closer to the driver, their corresponding occupant images 32a, 32b are shown in a location on the image display unit that is typically closer to the driver. Further, occupants 30b, 30d are seated on the left side of the vehicle 12, and accordingly, their occupant images 32b, 32d can be displayed on the left side of the image display unit 26. Similarly, occupants 30a, 30c are seated on the right side of the vehicle 12, and accordingly, their occupant images 32a, 32c can be displayed on the right side of the image display unit 26. If only two occupants are present, it may be advantageous to incorporate the occupant images higher on the image display unit so as to intrude less on the remainder of the display. Other display arrangements are certainly possible, and will likely vary depending upon the arrangement and number of the occupants.

Figure 4:
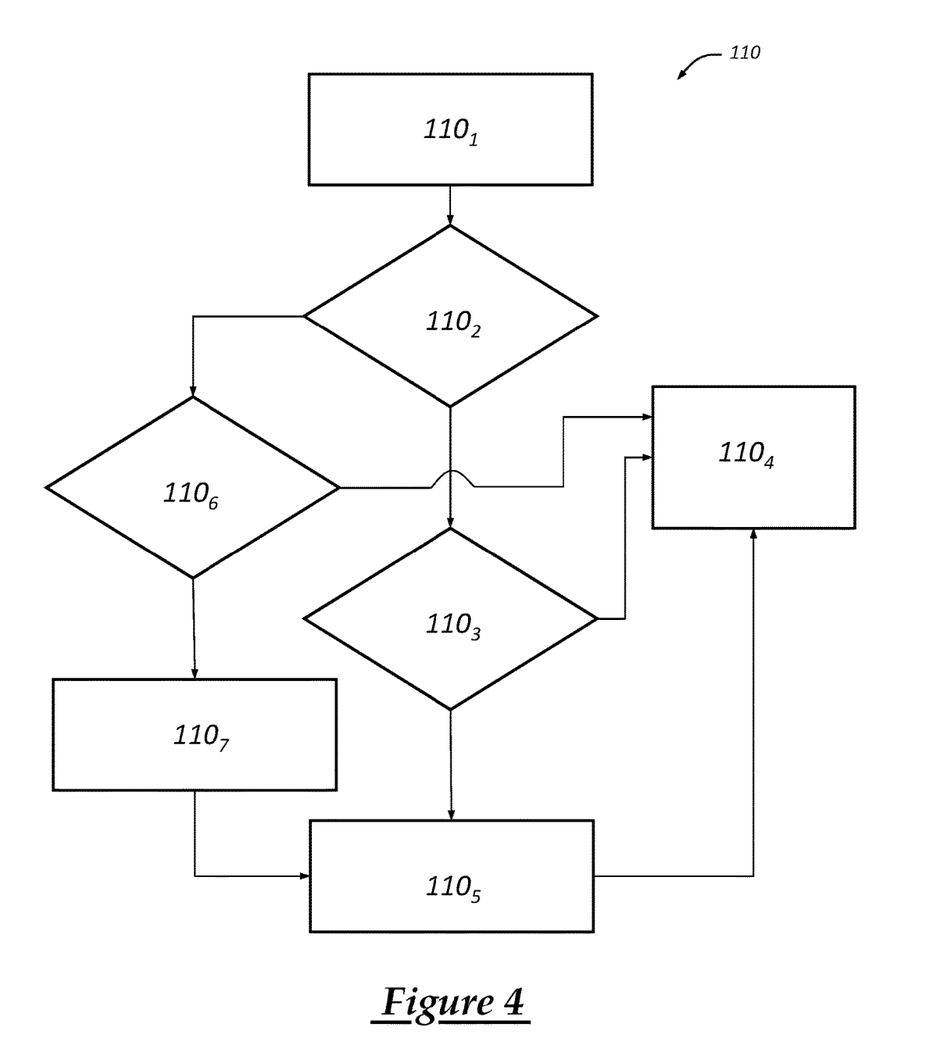
FIG. 4 is a flowchart of an exemplary embodiment of a displaying step of the method illustrated in FIG. 3.

FIG. 4 illustrates various substeps $110_1$-$110_6$ that may be used for step 110 of the method 100. Step $110_1$ involves determining the position of the occupant. This step may be accomplished using, for example, one or more of the object recognition processes described above with relation to steps 104 and 106. Step $110_2$ asks whether the occupant is in a rear facing position or a forward facing position. If the occupant is in a rear facing position, such as with occupant 30a, step $110_3$ asks whether there is a vehicle interior camera 20 in a forward facing orientation. If, for example, only camera 20a is present, which is in a rear facing orientation, then the method would move to step $110_4$ and return to step 106 of the method 100 to determine if another occupant is present. In most instances, it is undesirable to display the rear side of a car seat, for example, so the method will not display such an occupant image and will instead continue on to display one or more other occupants, such as forward facing occupants, if present. However, because camera 20b is present, and thus there is a vehicle interior camera present in a forward facing orientation for substep $110_3$, then the method will continue on to substep $110_5$. Substep $110_3$ may also be satisfied in instances where there is only one vehicle interior camera, such as a modular vehicle interior camera, that is in a forward facing orientation, without a camera in a rear facing orientation.

Determining the camera orientation for substep $110_3$, as well as substep $110_6$, which will be explained in more detail below, can be accomplished in any number of ways. In one embodiment, the camera orientation may be determined based on the camera output or video feed itself. For example, feature based detection may be used to localize the camera based on different vehicle features such as the back or front of seats, the rear window, the front window, etc. In another embodiment, a unique identifier may be used to determine the camera position. For example, wireless locating may be used, as the signal strength typically decreases with increasing distance from the control unit, the video processing unit 24, or another module or unit. Any operable localization scheme may be used to determine the vehicle interior camera orientation.

Substep $110_5$ involves outputting the occupant image to the image display unit. As described above, with an occupant 30a in a rear facing position, an occupant image 32a may be obtained from the right side perspective of the field of view 46b. Since occupant 30a is on the right side of the vehicle, it is advantageous to put the occupant image 32a on the right side of the image display unit 26, as shown in FIG. 2. Thus, in one embodiment, with an occupant in a rear facing position and a corresponding occupant image obtained from input from a vehicle interior camera in a forward facing orientation, the display arrangement will generally coincide with the camera field of view. As will be described in further detail below, with an occupant in a forward facing position and/or a vehicle interior camera in a rear facing orientation, an extra compensation step may be required in order to intuitively display the occupant images to the driver.

Returning to substep $110_2$, if an occupant is in a forward facing position instead of a rear facing position, the method continues to substep $110_6$ to determine whether there is a vehicle interior camera in a rear facing orientation. Substep $110_6$ is similar to substep $110_3$, and any of the orientation determining steps described above may also be used with this substep. Again, as with substep $110_3$ if, for example, only camera 20b is present, which is in a forward facing orientation, then the method would move to substep $110_4$ and return to step 106 of the method 100 to determine if another occupant is present. In most instances, it is undesirable to display the backside of an occupant in a forward facing position, for example, so the method will not display such an occupant image and will instead continue on to display one or more other occupants, such as rear facing occupants, if present. However, because camera 20a is present, and thus there is a vehicle interior camera present in a rear facing orientation for substep $110_6$, then the method will continue on to substep $110_7$. Substep $110_6$ may also be satisfied in instances where there is only one vehicle interior camera, such as a modular vehicle interior camera, that is in a rear facing orientation, without a camera in a forward facing orientation.

Substep $110_7$ involves compensating for the orientation of the vehicle interior camera. In this instance, as shown in FIG. 1, a vehicle interior camera 20a, which is in a rear facing orientation, has a field of view 46a that encompasses a number of occupants 30b-d that are in a forward facing position. Occupants 30b, 30d are situated on the left side of the vehicle, but are in the right side perspective of the field of view 46a. In order to display them in a more intuitive format to the driver on the image display unit 26, the occupant images 32b, 32d, which were obtained from the right side perspective, are displayed on the left side of the image display unit 26 to coincide with the respective locations of the occupants in the vehicle, as shown in FIG. 2. As shown in FIG. 4, the compensation substep is typically used with vehicle interior cameras that are in a rear facing orientation. The compensation substep is particularly useful with one or more modular vehicle interior cameras. For example, if a driver pulls the camera in a rear facing orientation out to put it in a vehicle interior camera docking station that is in a forward facing orientation, the system can adjust the location of the occupant image on the image display unit automatically. After the compensation substep, the method continues to substep $110_5$ to output the occupant image to the display unit in accordance with the compensated display position.

The image display unit 26 shown in FIG. 2 shows the outputted occupant images 32. As shown, it is possible to display occupant images obtained from occupants in the same row on opposite sides of the image display unit. Additionally, it is possible to display occupant images obtained from occupants in closer rows to the driver closer to the driver on the image display unit. Other display arrangements are certainly possible. It may also be possible to have two more occupant images displayed on either the right side or the left side of the image display unit, but more toward the center than the displayed occupant images, to represent occupants seated in middle seats. Also, if only two rear occupants are present, it is preferable to include their occupant images toward the top of the image display unit if the image display unit is an electronic display mirror so as to avoid interference with the view of the road on the bottom of the display.

Step 110 may also preference particular occupant images if, for example, a limited amount of space is present on the image display unit. In one embodiment, occupants in a rear facing position may be preferred over occupants in a forward facing position, as viewing infants or young children is typically more desirable. Similarly, occupants seated in child safety seats may be preferred over occupants not seated in child safety seats. Other preference schemes are certainly possible.

Returning to FIG. 3, after the displaying step 110, the method continues to step 112 to determine whether another camera is present. This step may be optional. For example, the video feed from multiple vehicle interior cameras may be processed together in steps 102-110. If it is determined in step 112 that another camera is present, the method may instead sequentially process the information from each of the cameras in steps 102-110. If there is not another camera present, the method may end.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle occupant viewing system, comprising:
an image display unit;
a vehicle interior camera having a field of view at least partially covering an interior cabin of the vehicle; and
a video processing unit coupled to the image display unit and the vehicle interior camera, the video processing unit being configured to receive input from the vehicle interior camera, determine whether an occupant is present in the field of view of the vehicle interior camera, and when an occupant is present in the field of view, overlay an occupant image of the occupant onto another image or video being shown in the image display unit, a location of the overlaid occupant image being dependent on the vehicle interior camera's orientation and the occupant's position in the vehicle, wherein the video processing unit is further configured to display two or more occupant images from occupants in one row of seating on opposite sides of the image display unit with at least part of the another image or video being shown in the image display unit at least partially between the two or more occupant images.

2. The vehicle occupant viewing system of claim 1, wherein the video processing unit is configured to extract video data from an occupant region of interest to form the occupant image and overlay the occupant image in the form of a video stream onto the other image or video being shown in the image display unit.

3. The vehicle occupant viewing system of claim 1, wherein the image display unit is an electronic display mirror and the other image or video of the image display unit includes an image or video of an area behind the vehicle.

4. The vehicle occupant viewing system of claim 1, wherein the image display unit is a touch screen and a user can X-out one or more occupant images being displayed on the image display unit.

5. The vehicle occupant viewing system of claim 1, wherein the vehicle interior camera is a modular vehicle interior camera movable between the forward facing orientation and the rearward facing orientation.

6. The vehicle occupant viewing system of claim 5, further comprising a plurality of stationary vehicle interior camera docking stations coupled to a vehicle communication network, wherein the modular vehicle interior camera has a unique identifier and the video processing unit can determine the vehicle interior camera's orientation based on the unique identifier of the modular vehicle interior camera or based on the coupling of the modular vehicle interior camera with at least one of the stationary vehicle interior camera docking stations.

7. The vehicle occupant viewing system of claim 1, wherein the video processing unit is configured to determine whether the vehicle interior camera is in a forward facing orientation that is oriented toward a front end of the vehicle or a rearward facing orientation that is oriented toward a rear end of the vehicle, and display an occupant image on a side of the image display unit depending on whether the vehicle interior camera is in the forward facing orientation or the rearward facing orientation.

8. The vehicle occupant viewing system of claim 7, wherein the field of view of the vehicle interior camera includes a left side perspective and a right side perspective.

9. The vehicle occupant viewing system of claim 8, wherein when the vehicle interior camera is in the forward facing orientation, the occupant image is displayed on the left side of the image display unit when an occupant is present in the left side perspective of the field of view of the vehicle interior camera and the occupant image is displayed on the right side of the image display unit when an occupant is present in the right side perspective of the field of view of the vehicle interior camera.

10. The vehicle occupant viewing system of claim 8, wherein when the vehicle interior camera is in the rearward facing orientation, the occupant image is displayed on the left side of the image display unit when an occupant is present in the right side perspective of the field of view of the vehicle interior camera and the occupant image is displayed on the right side of the image display unit when an occupant is present in the left side perspective of the field of view of the vehicle interior camera.

11. The vehicle occupant viewing system of claim 1, wherein the vehicle interior cabin has three rows of seating.

12. The vehicle occupant viewing system of claim 1, wherein the video processing unit is configured to preference occupants in a rear facing position over occupants in a forward facing position and occupants seated in child safety seats over occupants not seated in child safety seats.

13. A vehicle occupant viewing system, comprising:
an image display unit;
a first vehicle interior camera having a first field of view;
a second vehicle interior camera having a second field of view, wherein the first field of view of the first vehicle interior camera and the second field of view of the second vehicle interior camera at least partially overlap; and
a video processing unit coupled to the image display unit and the first and second vehicle interior cameras, the video processing unit being configured to receive input from the first and second vehicle interior cameras, determine whether an occupant is present in the first field of view of the first vehicle interior camera, the second field of view of the second vehicle interior camera, or both the first field of view of the first vehicle interior camera and the second field of view of the second vehicle interior camera, and display an occupant image on the image display unit in accordance with the occupant's position in the vehicle, wherein the video processing unit is further configured to determine if the occupant is sitting in a forward facing position or a rearward facing position so a rearward facing occupant can be viewed with the first vehicle interior camera or the second vehicle interior camera depending on the orientation of the first vehicle interior camera or the second vehicle interior camera.

14. The vehicle occupant viewing system of claim 13, wherein the first vehicle interior camera is oriented in a rear facing orientation toward a rear end of the vehicle and when the occupant is sitting in a forward facing position, the occupant image is obtained from the input of the first vehicle interior camera and displayed on a side of the image display unit that coincides with a side of the first field of view.

15. The vehicle occupant viewing system of claim 13, wherein the second vehicle interior camera is oriented in a forward facing orientation toward a front end of the vehicle and when the occupant is sitting in a rearward facing position, the occupant image is obtained from the input of the second vehicle interior camera and displayed on a side of the image display unit that is opposite from a side of the second field of view.

16. The vehicle occupant viewing system of claim 13, wherein the video processing unit is configured to extract video data from an occupant region of interest to form the occupant image.

17. The vehicle occupant viewing system of claim 16, wherein the occupant image is a video stream and the video processing unit is configured to overlay the occupant image onto another image or video being shown in the image display unit.

18. The vehicle occupant viewing system of claim 13, wherein the image display unit is a touch screen and a user can X-out one or more occupant images being displayed on the image display unit.

19. A vehicle occupant viewing system, comprising:
an image display unit;
a plurality of stationary vehicle interior camera docking stations located in an interior cabin of the vehicle;
a modular vehicle interior camera configured to mount in one of the stationary vehicle interior camera docking stations and configured to be movable between the plurality of stationary vehicle interior docking stations such that the modular vehicle interior camera is configured to be mounted to any one of the plurality of stationary vehicle interior docking stations; and
a video processing unit coupled to the image display unit and the plurality of stationary vehicle interior camera docking stations, the video processing unit being configured to receive input from the modular vehicle interior camera, determine whether an occupant is present in the field of view of the vehicle interior camera, and when an occupant is present in the field of view, display an occupant image on the image display unit in accordance with the occupant's position in the vehicle or the modular vehicle interior camera's mounting orientation.

20. The vehicle occupant viewing system of claim 19, wherein the modular vehicle interior camera has a unique identifier and the modular vehicle interior camera is configured to identify itself to the video processing unit wirelessly via the unique identifier.

21. A method of displaying a vehicle occupant on an image display unit, comprising the steps of:
receiving input from a vehicle interior camera, the vehicle interior camera having a field of view at least partially covering an interior cabin of the vehicle;
determining whether an occupant is present in the vehicle interior camera field of view; and
when an occupant is present in the vehicle interior camera field of view, displaying an occupant image on the image display unit in accordance with the vehicle interior camera's orientation and the occupant's position in the vehicle and inverting a display orientation of the occupant image on the image display unit when the occupant image is of an occupant in a rear facing position and the vehicle interior camera is in a forward facing orientation.

22. The method of claim 21, further comprising the step of extracting video data from an occupant region of interest to form the occupant image.

23. The method of claim 21, further comprising the step of dewarping the input from the vehicle interior camera to correct for a lens distortion.

* * * * *